United States Patent [19]

Jones

[11] Patent Number: 4,720,828
[45] Date of Patent: Jan. 19, 1988

[54] I/O HANDLER

[75] Inventor: Donald J. Jones, Nashua, N.H.

[73] Assignee: Wang Laboratories, Inc., Lowell, Mass.

[21] Appl. No.: 846,335

[22] Filed: Mar. 31, 1986

[51] Int. Cl.⁴ ............................. H04J 3/02; H04J 3/24
[52] U.S. Cl. ........................................ 370/85; 370/94; 340/825.5
[58] Field of Search .................. 370/85, 60, 94, 110.1, 370/88; 340/825.5

[56] References Cited

U.S. PATENT DOCUMENTS

| | | | |
|---|---|---|---|
| 3,789,145 | 1/1974 | Shah et al. | 370/85 |
| 4,301,532 | 11/1981 | Janetzky | 370/85 |
| 4,445,214 | 4/1984 | Reynolds et al. | 370/94 |
| 4,527,267 | 7/1985 | Cohen | 370/94 |
| 4,597,078 | 6/1986 | Kempf | 370/85 |
| 4,631,534 | 12/1986 | Franklin et al. | 370/85 |

Primary Examiner—Douglas W. Olms
Assistant Examiner—Frank M. Scutch, III
Attorney, Agent, or Firm—Michael H. Shanahan; Kenneth L. Milik

[57] ABSTRACT

An i/o handler providing communication between a host computer and a plurality of peripheral stations has a abutting member positioned adjacent to the computer and a distributing member removed from the computer. The two members are connected by a communication link with data paths and separate control paths. Communications on the link are by a protocol with synchronized time multiplexed channels and exchange of synchronizing signals in every frame. The handler minimizes the space required at the immediate site of the computer for external communications.

4 Claims, 7 Drawing Figures

I/O HANDLER

SUMMARY OF THE INVENTION

The invention relates to an i/o handler for a computer—a device passing data between the computer and devices external to the computer.

In the usual computer design, the internal movement of data is effected by transmissions in parallel bit form on one or more buses of parallel conductors operating at high speed, standardized signal levels, and in synchronization with other computer operations. A device external to the computer with which the computer needs to exchange data may have a protocol for exchanging data that is quite different from that of the computer. To deal with this disparity between the computer's internal data transfer protocol and that of the external device it has been the practice to use an i/o device as an intermediary to exchange data with the computer and the external device each using its own protocol and to translate between the two. The positioning of the i/o device adjacent to the computer is mandated because it is not practical to extend the high speed bus of the computer any distance.

Depending in part on the complexity of the translation involved, an i/o device may require considerable hardware and take an appreciable amount of room as compared to the computer. However, as computers are designed to be faster and smaller and to exchange data with more external devices, it can be difficult or impossible to find enough room at the periphery of the computer to place the required i/o devices.

This invention addresses the problem of space for i/o devices at the periphery of a computer by providing a multichannel i/o handler capable of linking the computer to a plurality of external devices. This i/o handler performs the overall i/o translation in two stages. One of these stages takes place in an abutting member abutting the computer and the other stage takes place in a distributing member removed from the computer and connected with the abutting member through a communicating link. Outbound data from the computer destined for any of a plurality of destinations is transferred directly from the computer bus to the abutting member where it is translated to a link protocol and exported on the link to the distributing member. In the distributing member the data is taken from the link and loaded into storage elements respectively associated with the several destinations. From these storage elements the data for each of the several destinations is taken, processed individually to conform it to the protocol of its destination, and distributed to the several destinations. Data moving from the destinations to the computer essentially reverse the operations of the outgoing data.

The protocol used on the link between the abutting and the distributing members of the i/o handler is designed both to provide reliable data transmission and to minimize the processing required in the abutting member, where space is at a premium. The link transmits data serially on a time division multiplexed data path, with a frame interval divided into channel intervals, a channel being assigned to each destination in fixed rotation. The number of serial data bits in each channel interval is equal to the number of data bits in a parallel word on the computer's data bus. Thus the computer exports to the abutting member a parallel word, say eight bits wide, associated with an address specifying what destination is to receive the word. In the link protocol, the address appears as the number of the channel in the frame, and the eight bits of the word appear as the serial bits in the channel interval. Control signals are passed on the link on paths distinct from the data paths, thus avoiding any need to envelope the data sequence. This isomorphism between the protocol of the computer bus and that of the link minimizes the processing required and consequently the space required in the abutting member.

The link operates in a synchronous mode (as between the two members, not necessarily with the computer). Synchronization is initially established by a method by which either member can force both members into a defined break state. The next step of the procedure is the exchange of signals by switching the signal value on the paths of the link. This is followed by the sending and returning of a Manchester encoded training sequence. On confirmation of the transmission of the training sequence a sync signal is propagated and repeated every frame interval on a dedicated control path to enforce frame synchronization. In addition, one channel of the frame is dedicated to sending a special sync word from the distrbuting member to the abutting member and then returning the word to the sender for confirmation. This arrangement makes it possible to establish initial synchronization or recover lost synchronization in a period of one frame interval or less.

Bit synchronization is accomplished by dedication of one of the several channel intervals to transmission of a special sync sequence and by using Manchester encoding of data. The link protocol also features a readiness signal propagated in the direction from the distributing member towards the abutting member on its own path. This signal is coordinated with the framing cycle and indicates for each channel whether the distributing member is ready to receive the next word of data. This feature gives the handler flexibility in serving a wide range of destination protocols, some of which may pass data at a slower rate than does the handler.

DETAILED DESCRIPTION OF THE INVENTION

Figure 1:
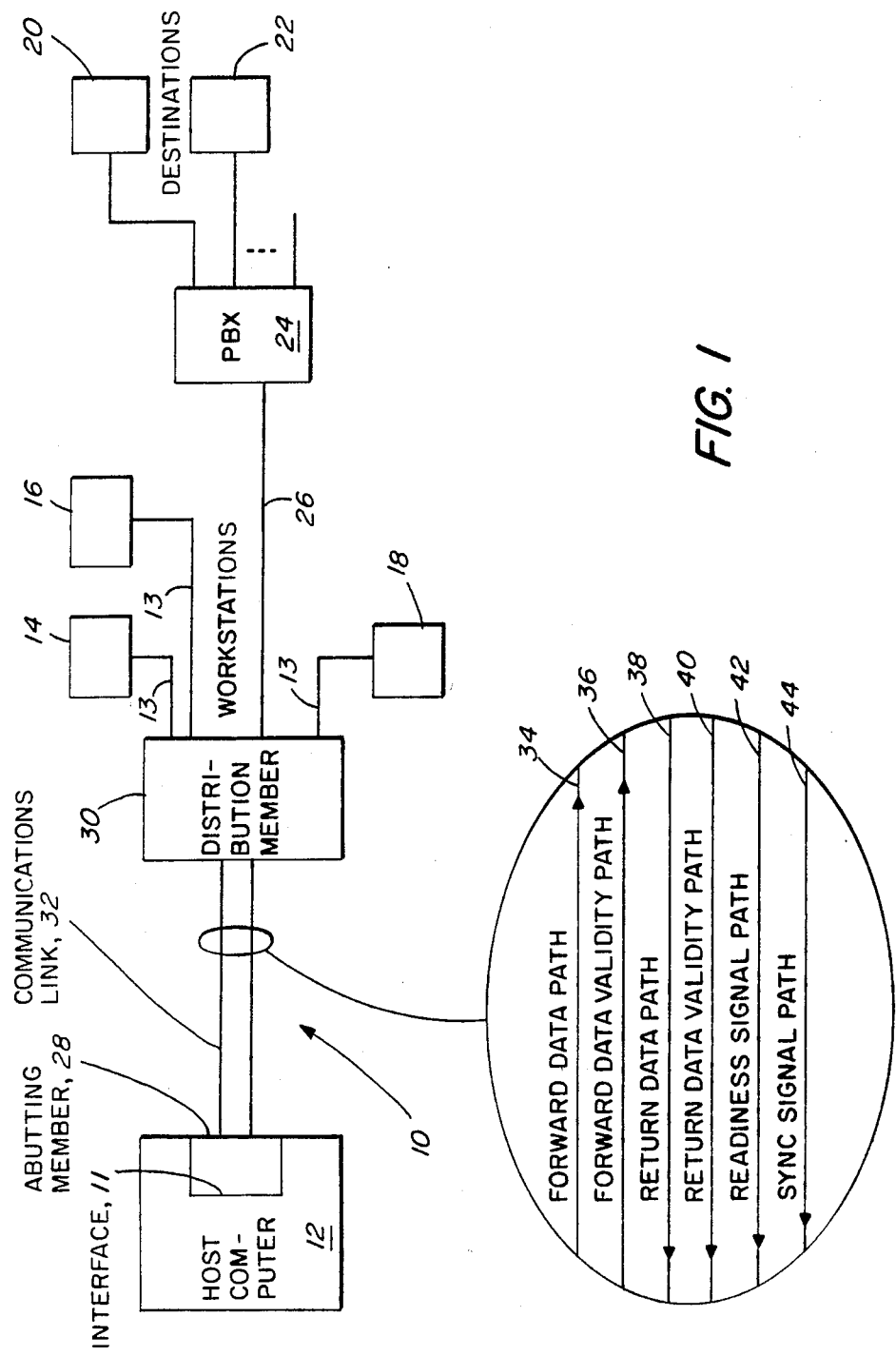
FIG. 1 shows an i/o handler according to the invention as it is used in communicating between a host computer and a plurality of destinations.

Referring to the Figures, particularly FIG. 1, an i/o handler 10, according to the invention, transfers data between host computer 12 and a plurality of destinations 14-22. The destinations are shown as work stations 14, 16, 18 connected directly to handler 10 on connections 13, and stations 20, 22 connected indirectly through a standard T1 line 26 and PBX 24. The type and arrangement of destinations is illustrative only, as it is one of the advantages of the handler that it can connect to any arrangement or type of destinations.

Handler 10 includes an abutting member 28 abutting and connected to computer 12 at interface 11, a distributing member 30 removed from computer 12 and connected to the several destinations, and communicating link 32 connecting the abutting and distributing members. Link 32, as shown in the blow up in FIG. 1, includes forward data path 34, and forward validity path 36, both propagating from the abutting member 28, and return data path 38, return data validity path 40, readiness signal path 42, and sync path 44, all propagating from distributing member 30.

Figure 2:
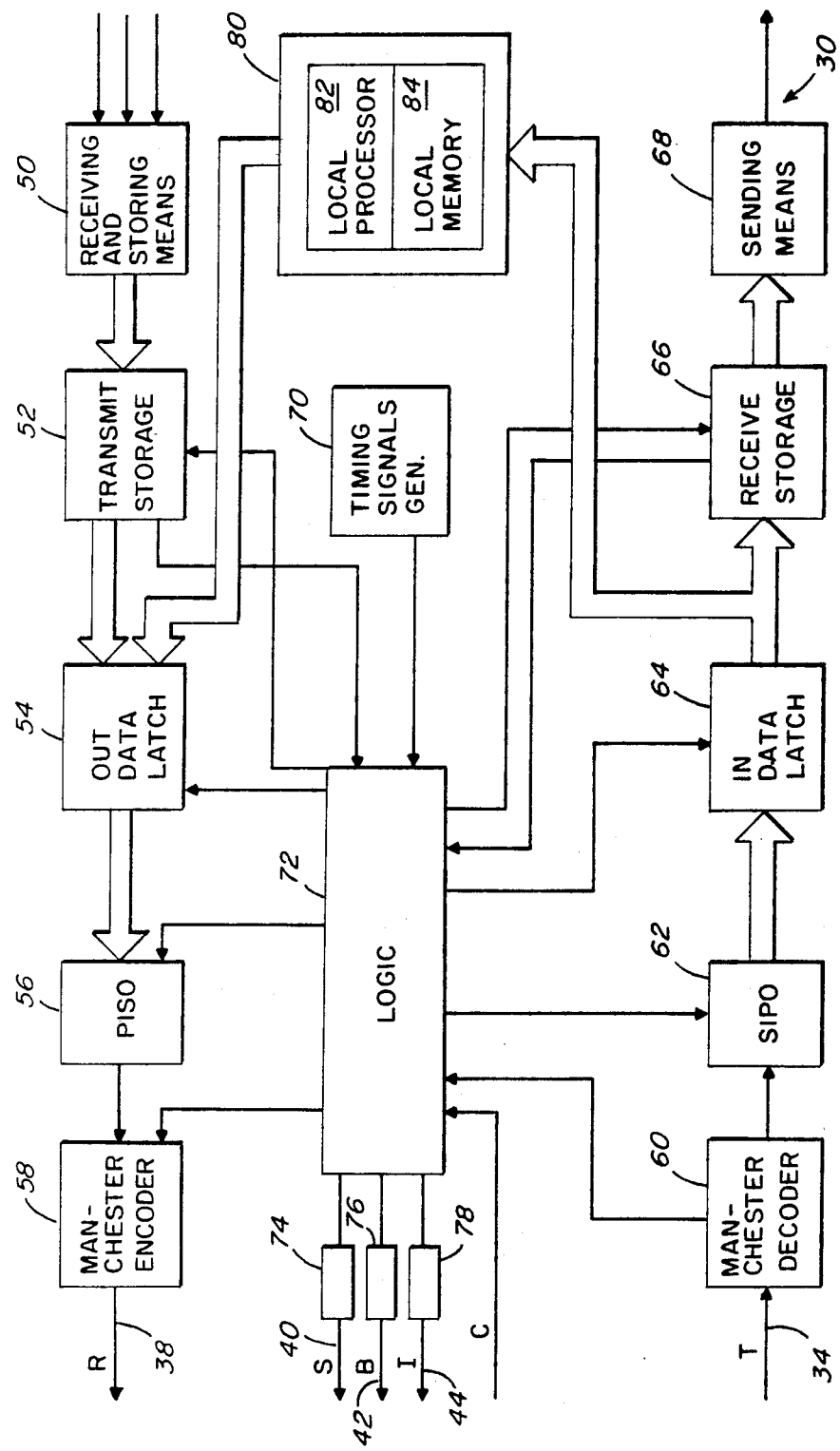
FIG. 2 shows a block diagram of the distributing member of the i/o handler of FIG. 1.

Turning now to FIG. 2 showing a block diagram of the distributing member, receiving and storing means 50 receives data from each of the several destinations and reforms this data into parallel format words such as are moved on the computer bus and stores these words in transmit storage 52. The apparatus and operation of receiving and storing means 50 to effect the transformation of the data from the destinations to the word format will be dependent on the particular protocol used by the destinations, and may be fairly complex and extensive. The function of receiving and storing means 50 is, however, as to each destination that of the conventional i/o device, and the design of such means is conventional and well known to those skilled in the art.

Transmit storage 52 provides a storage element for each of the several destinations where words from that destination are stored. From transmit storage 52 data passes on a bus to Out data latch 54, and thence to PISO 56, where it is converted to serial form, and then to Manchester encoder 58, and from there is exported on return data path 38.

Serial data flowing from the link 32 on path 34 passes through Manchester decoder 60 and SIPO 62, where it is put in parallel form, thence to In data latch 64, and then to receive storage 66, where it is stored in a storage element associated with its destination.

Timing signals generator 70 generates a periodic sync signal which defines frame intervals for the handler, signals defining channel intervals within each frame interval, signals defining bit times within channels, and other timing signals used in the operation. Logic 72 includes circuitry performing logical functions, and controlling all components. Logic receives input signals from path 36, timing generator 70, transmit storage 52, Manchester decoder 60, and receive storage 66, and it emits control signals to control output latches 74, 76, and 78, feeding paths 40, 42, and 44 respectively.

Distributing member 30 also includes a local computer 80, comprising local processor 82, and local memory 84, which are used to collect operational statistics, perform diagnostics, or perform other houskeeping operations. Provision is made to switch data from In data latch 64 to local computer 80, and to load Out data latch 54 from local computer 80 as an alternative to servicing the destinations.

Figure 3:
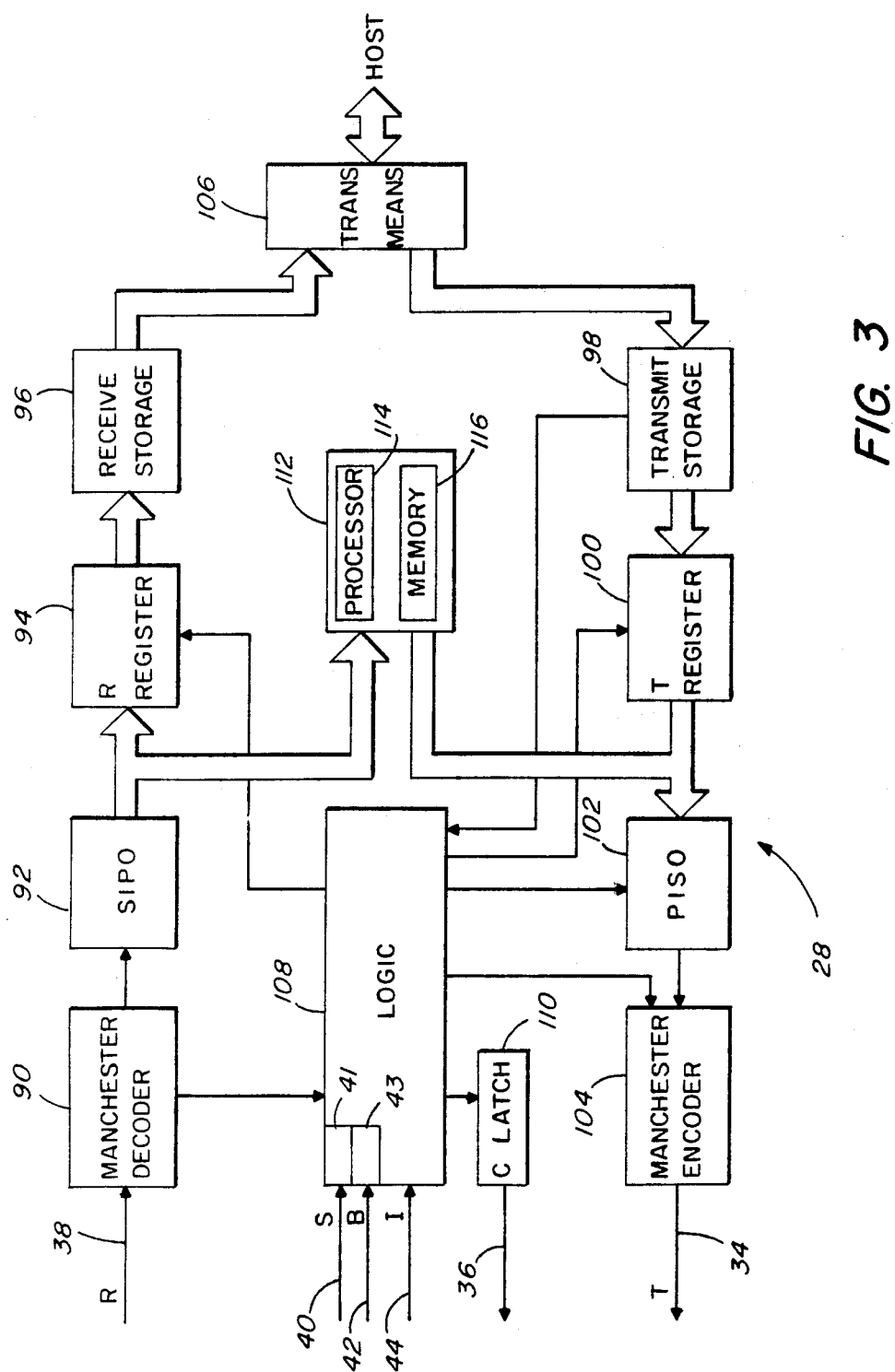
FIG. 3 shows a block diagram of the abutting member of the i/o handler of FIG. 1.
Figure 4:
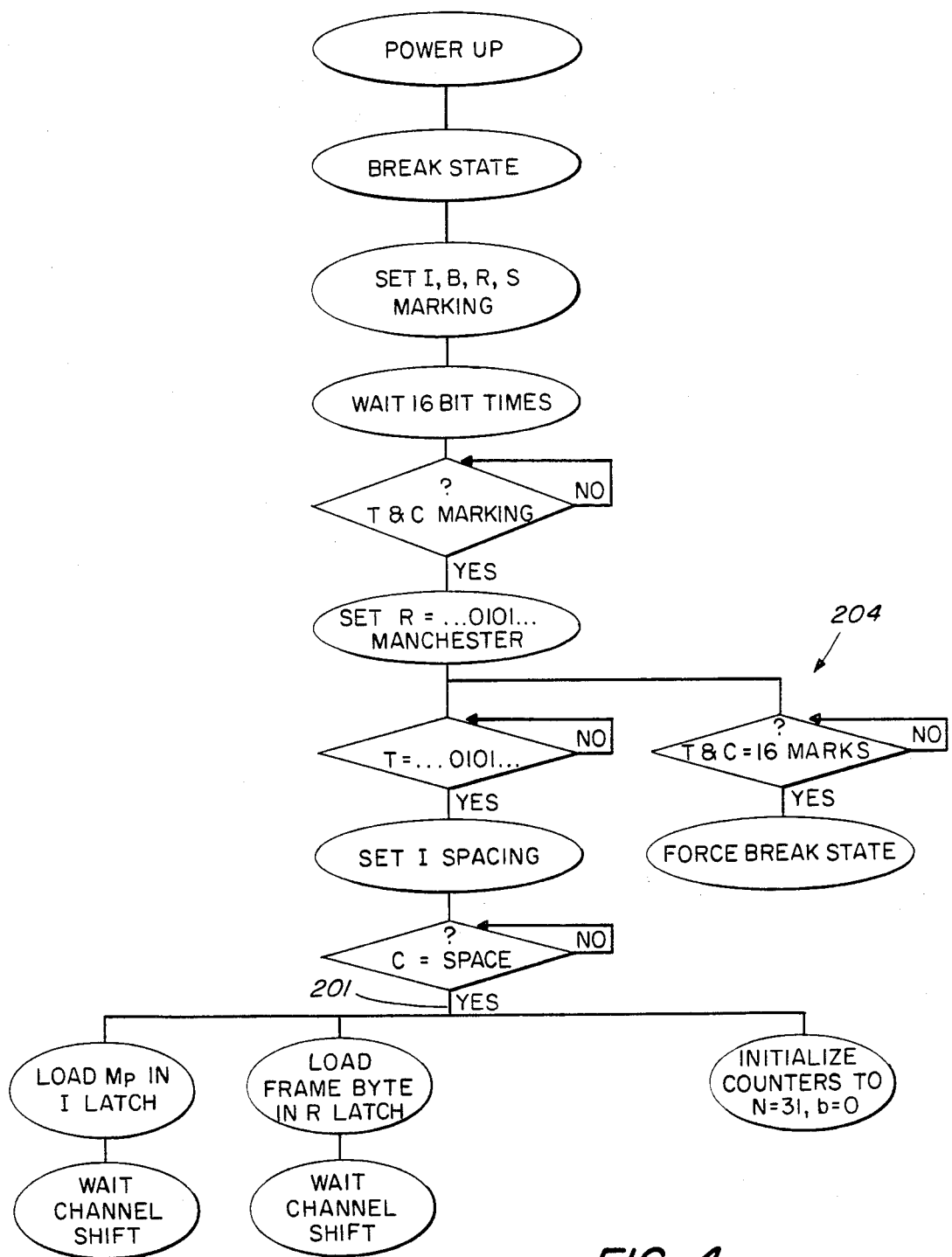
FIGS. 4-7 show state diagrams of the operation of the i/o handler of FIG. 1.
Figure 5:
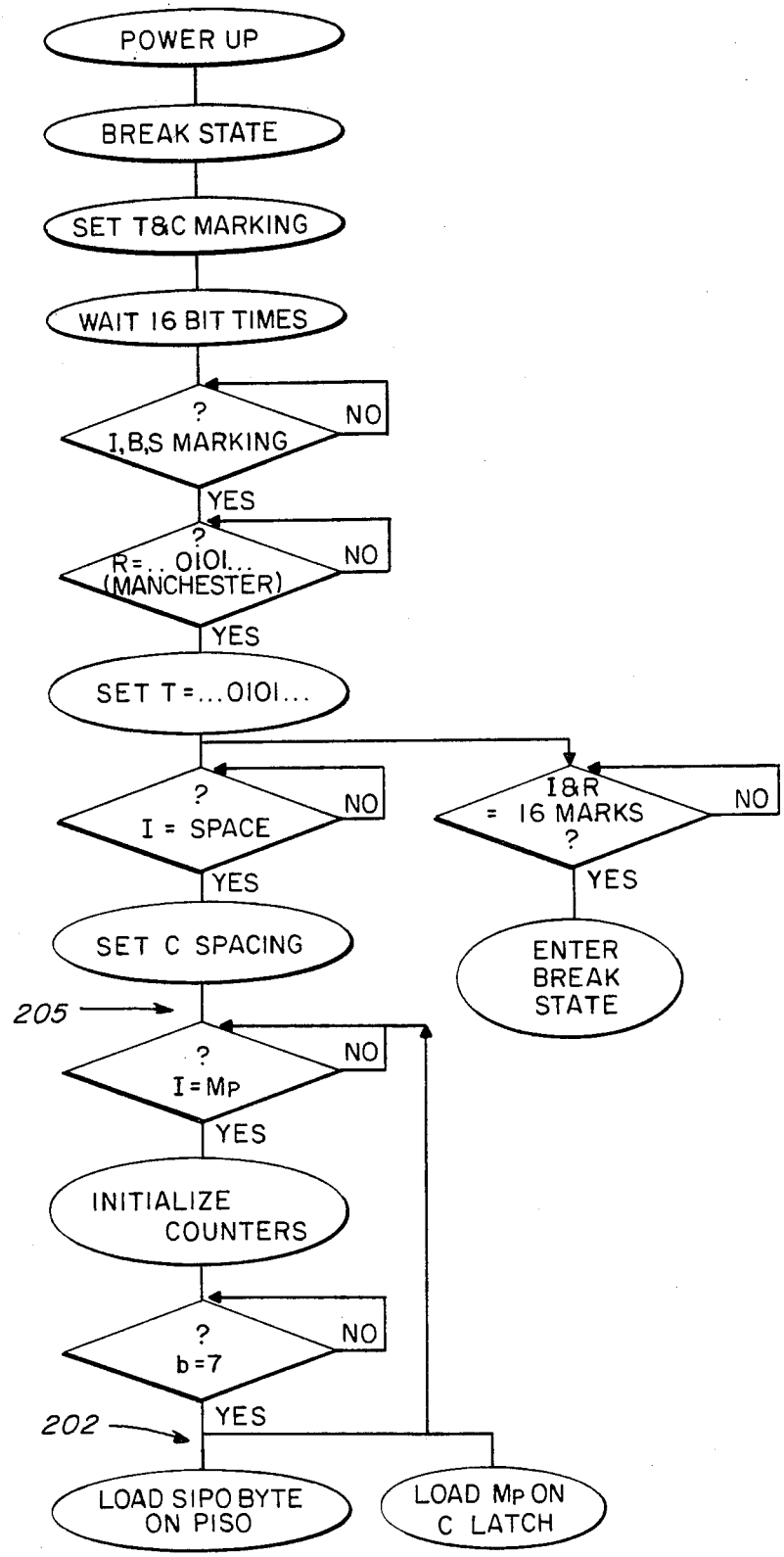

Turning now to FIG. 3 showing a block diagram of abutting member 28, serial data coming from distributing member 30 on path 38 passes through Manchester decoder 90 and SIPO 92, where it is put in parallel form and entered into receive latch 94. From receive latch 94 data is transferred to receive storage 96, where it is stored in a storage element associated through its address with the destination from which it came. A data word stored in transmit storage 98 at an address associated with the destination to which it is to be sent is passed to transmit latch 100, and thence to PISO 102, then through Manchester encoder 104 to data path 34 of link 32. Transfer means 106 receives data words and addresses indicating a destination from the host computer bus system and enters the data in the appropriately addressed storage element of transmit storage 98, and also takes words from receive storage 96 and delivers them to the computer bus system together with an address indicating the originating destination. Logic 108 includes circuitry performing logical functions. It receives control signals from link path 40, which is entered into S In latch 41, from path 42, which is entered into B In latch 43, and from path 44, and from transmit storage 98. It emits control signals to latch 110 for transmission on path 36 and other control signals generally controlling the operation of the member.

Local computer 112 with processor 114 and local memory 116 is included in member 28 and may be switched to receive or send data over the link as an alternative to servicing the destinations. The specific operation of the handler will now be described for an application where the host computer bus carries eight bits in parallel form, and where 30 destination stations are communicating with the computer through the i/o handler. Corresponding to these design parameters, the frame of the handler will be defined to have 32 channels (a number big enough to permit assigning one to each destination, and a convenient power of 2) and each channel will carry serially 8 bits (equal to the width of the computer bus).

The operation of the i/o handler can be understood with reference to FIGS. 4–7 showing state diagrams of the logic in the two members. It will be convenient to designate the paths of the link with initials as follows:

T: Forward data path
C: Forward data validity path
R: Return data path
S: Return data validity path
B: Readiness signal path
I: Sync path Timing signal generator 70 generates a repeated cycle of signals defining and corresponding to the frame interval and subdivisions thereof. In particular it generates signals indicating what channel and what bit within the channel is "current". Channels will be numbered 0 to 31, and bits 0 to 7. "N=7" will mean the current channel is number 7, and "b=4" will mean the current bit is 4. All timing signals are supplied directly to the logic of the distributing member and are available for logical operations processed in the logic. Equivalent timing signals are derived in the logic of the abutting member from signals received over the link from the distributing member and are similarly used.

Transmissions over link 32 are in synchronous mode and on start up or after any interruption of communication it is necessary for the two members to go through an interactive procedure to place them in mutually synchronous operation. This procedure is diagrammed in FIG. 4 for the logic of the distributing member and in FIG. 5 for the logic of the abutting member. (The transmission of a mark or space pulse is indicated on the diagrams by Mp or Sp respectively. These are pulses which last for at least one and not more than four bit times.)

After power up each member sets sets all its link paths marking, which is the inactive state for the paths. The distributing member starts the coordination routine after 16 bit times of marking by transmitting a Manchester encoded training sequence . . . 0101 . . . on the R path, and when this is detected by the abutting member the same signal is returned on the T path. After some more exchanges the distribution member arrives at point 201.

It may be noted that after a member has started the Manchester signal it starts a monitoring loop (indicated at 203 and 204) which continually monitors whether certain lines have had mark signals for the last 16 bit times, and if so forces entry to the break state. Thus either member will force the other into the break state by continuously sending mark signals for 16 bit times. Since marks are sent on all paths in the inert or off condition, this means that in the event of any disablement of either member, the other will stop ordinary operations, revert to the break state and cyclically attempt the start up operation.

Figure 7:
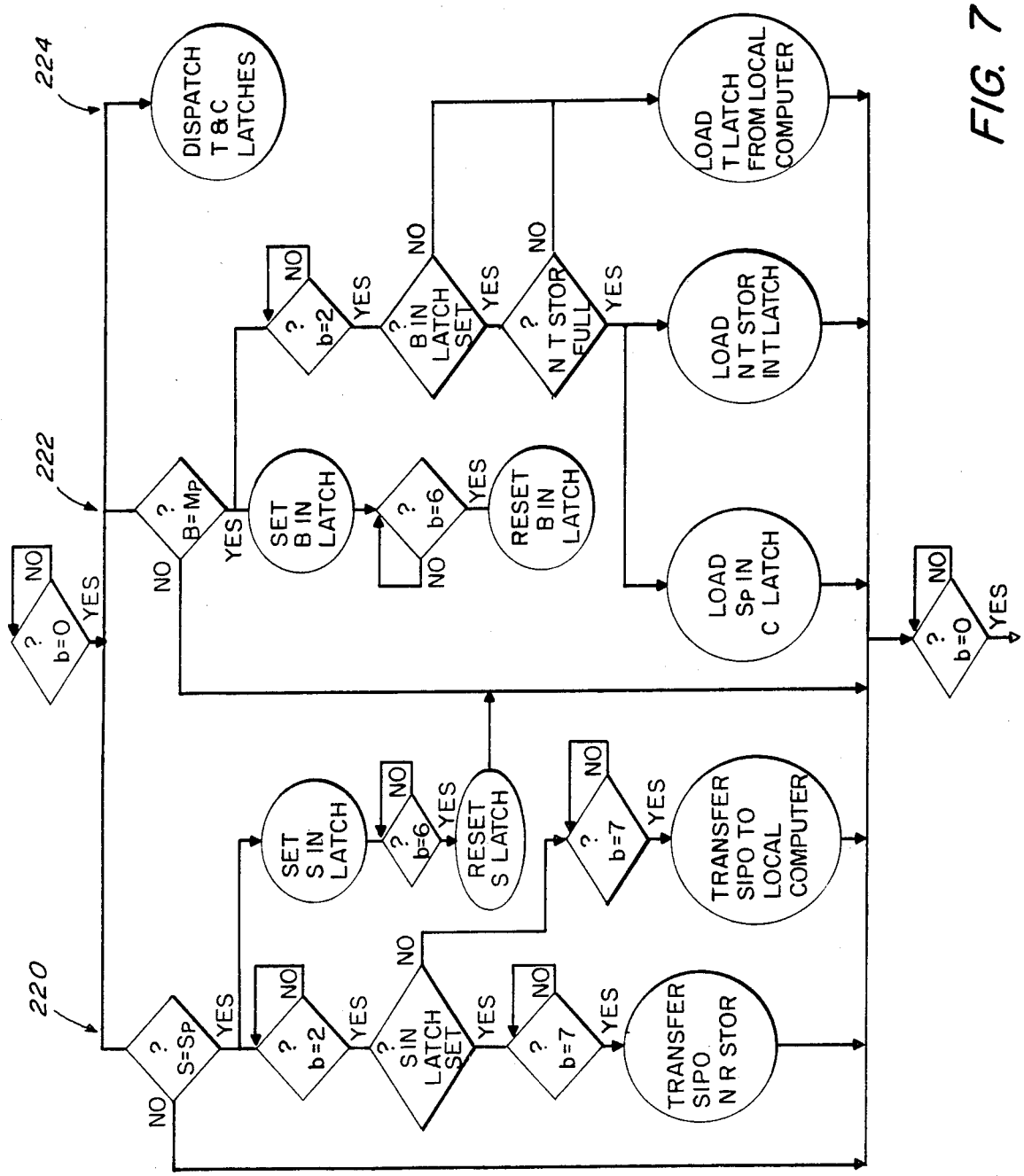

Now turning to FIG. 7 showing the operating cycle of the abutting member, the chain at 220, which starts with a channel shift, decides what to do with incoming data from the distributing member. The S signal is latched into the S In latch. Then at b=2 the S In latch is evaluated. If the S In latch is set (indicating valid incoming data) at b=7 (when the whole of the word has been received) the word in SIPO is transferred to the $N^{th}$ storage element of the receive storage; if the value of S in latch indicates invalid data, the word is tranferred to the local computer.

The chain at 222 prepares the latches for sending during the next channel. The B signal indicating whether the distributing member is in condition to receive data for channel N is latched into the B In latch, and at b=2 evaluated. If the B In latch indicates there is room for data for the $N^{th}$ channel in the distributing member and if there is data to send, the T latch is loaded from the T storage and a space pulse is loaded in the C latch; otherwise the T latch is loaded from the local memory.

The chain at 224 dispatches latches previously prepared at the channel shift.

It should be noted that the cycle at 205, 202 (FIG. 5) continues to operate searching for a sync signal, and if one is found the counters will be initialized aborting the chain at 222. Frame synchronization actually starts after the confirmation signal at 201. Up to this point the R transmissions have been either line level changes or the free running Manchester training sequence .. 0101 ... At this point the timing counters of the distributing member are initialized to the beginning of channel 31 and the R latch is loaded with a defined sync word, namely 11110000. When the counters next shift channels (which will be to N=0, b=0), the Mp will be transmitted on the I path and the frame byte will be transferred to the PISO which will begin to send it out on the R path in serial form in accordance with the advance of the bit counter. In the meantime the abutting member has been waiting at point 202. When it receives the mark pulse on path I it initializes its counters thus putting the channel counters of the two members into a defined relationship. The abutting member then waits for b=7 (at identifying numeral 205), when the full frame word will have been received on path R and be in its SIPO, and loads the SIPO into the PISO to be returned on the T path after the channel shift. At 205 the abutting member also loops back to 202 and restarts the search for a sync pulse on the I path. This loop continues during the normal operation of the handler and forces the resynchronization of the abutting member every time a sync pulse is received on the I path.

Figure 6:
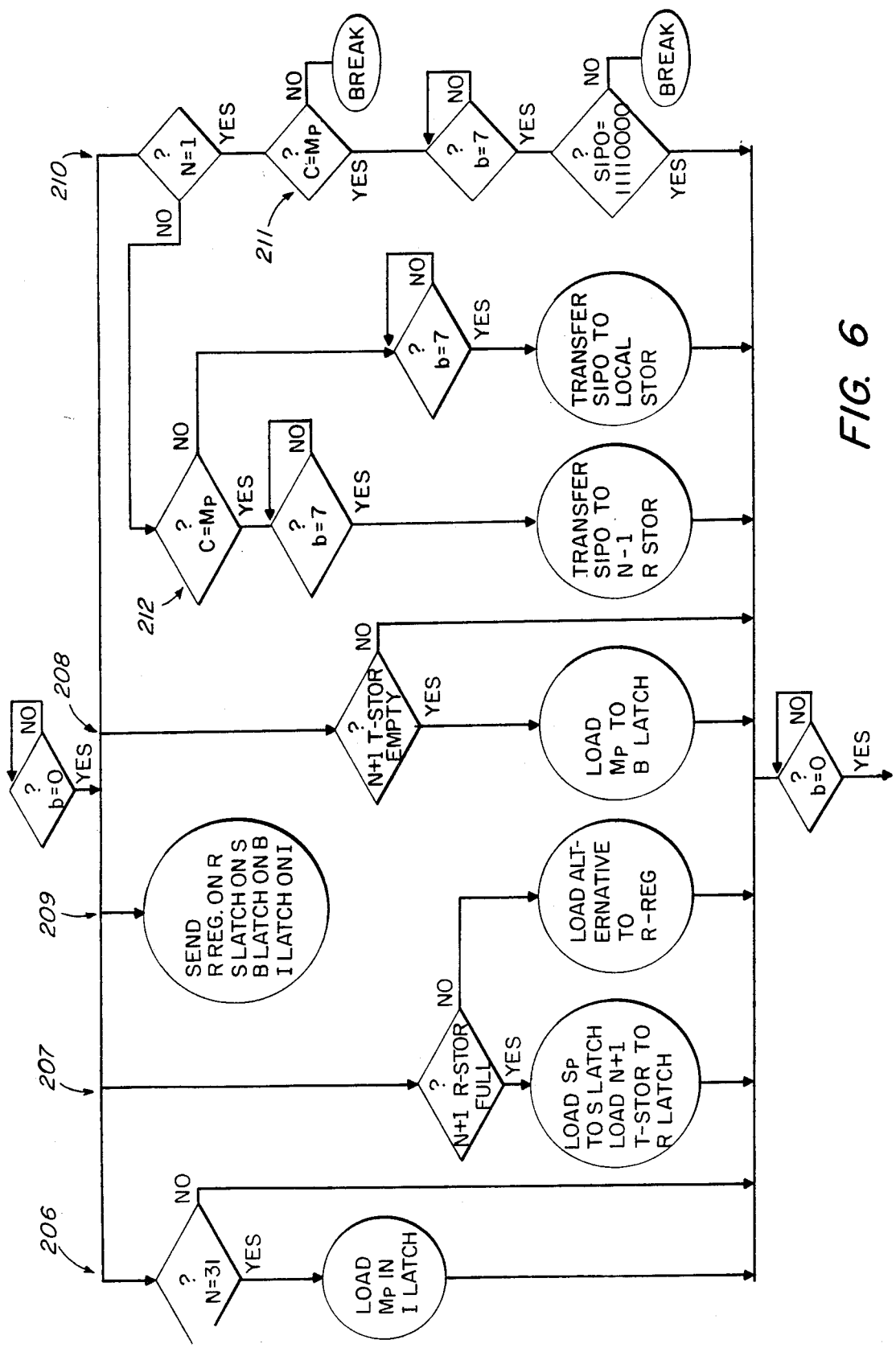

Turning now to FIG. 6 showing the operating cycle of the distributing member, the chain at 206 prepares the I latch to send a mark pulse if the current channel is 31. (The pulse will then be sent when the channel shifts to 0.)

The chain at 207 prepares the R latch to send a word. If the return storage element for the N+1 channel (associated with the N+1 destination) is full that word is loaded into the R latch and a space pulse is loaded into the S latch; if the return storage element for the N+1 channel is not full the R latch will be loaded with an idle word or alternative word from the local computer, but no space pulse will be loaded to the S latch. The storage element for the 0th channel (for which there is no assigned destination) is taken to be a storage element permanently loaded with the frame word, 11110000, and no space pulse is loaded when it is loaded.

The chain at 208 prepares the B latch. If the N+1 transmit storage element is empty (indicating that there is a place to put an incoming word on that channel) a mark pulse is loaded into the latch; otherwise not.

The chain at 209 dispatches all the prepared latches at the channel change.

The chain starting at 210 makes the decisions about what to do with incoming signals. If the channel number is 1, synchronization confirmation signals consisting of a mark pulse on C and a frame word on T should be returned from the abutting member. The chain at 211 checks this expectation and if the signals are not right forces the distributing member to the break state. (It will be recalled that this will in turn force the abutting member to break and start up procedures will be reinitiated.) If it is not channel 1, the chain at 212 samples the C signal to see if the data is valid for transmission to its destination. If it is, when the SIPO is full (b=7) the word is transferred to the N−1 element of the receive storage; if not the data is transferred to the local computer.

The i/o handler is made with standard commercially available components and the detailed circuitry to implement it will be well understood by those skilled in the art from the state diagrams. The link paths can employ any electrical or optical medium suitable for transmission of information.

What is claimed is:

1. An i/o handler for passing data between a host computer and a plurality n of destinations, including an abutting member, a distributing member and a communicating link communicating between said abutting member and said distributing member, said link comprising a forward data path and a forward data validity path both transmitting in the direction abutting member-to-distributing member, and a return data path, a return data validity path, a readiness signal path, and a sync signal path transmitting in the direction distributing member-to-abutting member, said distributing member including n distribution transmit storage elements correspondingly associated with said destination and means for receiving from each of said n destinations and storing in the corresponding distribution transmit storage element data to be forwarded to said computer on said link, n distribution receive storage elements correspondingly associated with said destinations and means for transmitting to said n destinations data stored in the corresponding distribution receive storage element, means for generating a periodic sync signal defining a cycle of frame intervals, means for generating signals defining a subdivision of each of said distribution frame intervals into m distribution channel intervals (m not less than n), n of said m distribution channel intervals being associated each with a corresponding destination, means for transmitting said sync signal on said sync signal path, means for transmitting on said return data path during the $i^{th}$ of said n distribution channel intervals a predetermined number of bits of the data from the corresponding $i^{th}$ distribution transmit storage element, means for generating a return data validity signal indicative of validity of data transmitted during a distribution channel interval on the return data path, and for transmitting this signal on the return data validity path during the same distribution channel interval, means for generating during each distribution frame interval a readiness signal associated with a corresponding destination and indicative of readiness of said distribution station to receive data for the corresponding destination, and for transmitting said readiness signals on the readiness signal path, means for receiving forward data validity signals on the forward data validity path and associating them with the corresponding destinations, means for receiving, associating with the corresponding destination, and, when accompanied by a concurrent signal of data valid on the forward data validity path, storing in the corresponding distribution receive storage elements data signals received on the forward data path, said abutting member including n host transmit storage elements correspondingly associated with said destinations, and means for receiving from said host computer and for storing in the corresponding host transmit storage element data to be dispatched to each of said n destinations, n host receive storage elements correspondingly associated with said destinations, and means for transferring to said host the contents thereof, means for receiving on said sync signal path said sync signal, and for deriving therefrom signals defining said distribution frame and channel intervals and signals defining host frame and channel intervals isomorphic to the distribution frame and channel intervals, means for receiving said readiness signals on said ready signal path and for associating each readiness signal with the corresponding destination, means for transmitting, if stored, a predetermined number of bits of data from the $i^{th}$ host transmit storage element, on said forward data path during the $i^{th}$ of said n host channel intervals, only when the last corresponding readiness signal received indicated a condition of ready, means for generating a forward data validity signal indicative of validity of data transmitted during a host channel interval on the forward data path, and for transmitting this signal on the forward data validity path during the same distribution channel interval, means for receiving return data validity signals on the return data validity path and associating the return data validity signals with the corresponding destinations, means for receiving, associating with the corresponding destination, and, when accompanied with a signal of data valid on the return data validity path, storing in the corresponding host receive storage elements data signals received on the return data path.

2. A communication link as claimed in claim 1, wherein the beginning of the host frame interval occurs one channel interval later than the beginning of the distribution frame.

3. An i/o handler for passing data between a computer having a parallel data bus moving data in parallel word format and each of a plurality of destinations remote from said computer, said handler having an abutting member abutting said computer and a distributing member removed from said computer, said abutting and distributing members being connected through a communicating link, said link having a forward data path propagating in the direction abutting member-to-distributing member, a return data path and a readiness signal path propagating in the direction distributing member-to-abutting member, and a sync path, said link operating according to a link protocol in which a periodic sync signal passed from one member to the other on said sync path defines for each direction a cycle of frame intervals, each frame interval is subdivided into m channel intervals (m not less than n), n of said channel intervals being each associated with a corresponding destination, during each of said n channel intervals a word of data is transferred in serial bit format from each member to the other, the transferred word destined for or coming from the corresponding destination, said abutting member having an interface connecting directly to the bus of said computer for exchanging data therewith in parallel word format, and means for transforming data exchanged with said computer bus to and from a form prescribed by said link protocol, said distributing member having means for sending to and receiving from each of said destinations communications according to a protocol appropriate to the respective destination and for transforming data exchanged with said destinations to and from a form according to said link protocol.

4. A method for initiating and maintaining synchronized operations between first and second stations communicating over data paths with a time division multiplexed frame having a plurality of channels and having control paths distinct from the data paths including the steps forcing both stations into an initial break state by a signal initiated by either station, initially sending from the first station and returning from the second for confirmation signals made by changing the signal value of the control paths, next sending from the first station and returning from the second for confirmation signals made by a repetitive sequence on the data path, then sending from the first station and repeating in every frame thereafter a synchronizing signal on a control path, and a special signal on the data path during a dedicated channel of the frame, these repeated signals being returned by the second station for confirmation, on failing to receive confirmation of any of the above described return signals, forcing both stations into the break state.

* * * * *